Dec. 10, 1968   J. D. PETERSEN   3,415,923
METHOD OF MAKING TIRE MOLDS
Filed May 9, 1966

INVENTOR.
JOHN D. PETERSEN
BY
J. B. Holden
ATTORNEY

United States Patent Office 3,415,923
Patented Dec. 10, 1968

3,415,923
METHOD OF MAKING TIRE MOLDS
John D. Petersen, Akron, Ohio, assignor to The Goodyear Tire & Rubber Company, Akron, Ohio, a corporation of Ohio
Filed May 9, 1966, Ser. No. 548,604
3 Claims. (Cl. 264—221)

ABSTRACT OF THE DISCLOSURE

Method of making tire molds comprising forming a core construction in the shape of a tire tread with thin metal blades embedded therein with a portion of said blades extending above the surface of the core element, pouring a rigid casting material against said core embedding the extended portion of the blades, removing the core from the mold and retaining said blade elements in said casting and removing said blades, machining said casting and returning said blades to the casting with a portion of each blade extending above the casting surface.

---

This invention relates to a method of making tire tread molds and in particular to molds having thin blade-like metal inserts embedded therein to form thin slots in the tread of a tire made in such mold.

The use of such blades is well known in the prior art and will not be discussed in any great detail since the advantages of such blades and the manner of mounting them in the mold are well described in Patent No. 2,263,001, issued to A. C. Gunsaulus et al., and Patent No. 2,227,582, issued to A. W. Bull. Suffice it to say that these blades are embedded in and project from the tread-forming portion of a mold core against which the tire mold is cast. When the mold is cast against the core the projecting portions of the blades become embedded in the mold and the portions of the blades which were embedded in the core, upon removal of the core from the mold, project from the tread forming portion of the mold to form slots in the tire tread corresponding to the pattern of the projecting portions of the blades. The most difficult problem encountered in making cast molds with blades embedded therein is that the projecting portions of the blades make it an extremely complicated operation to machine-off any irregularities from the mold surface in the area from which the blades project without damaging the blades.

The primary object of this invention is to provide a means of machining the tread-forming surface of a tire mold without mutilating, or destroying, the thin blades projecting therefrom.

Another object of the invention is to eliminate the necessity for cutting blade retaining slots in the tread-forming portion of a tire mold after the mold has been cast and the tread forming surface machined to the correct tolerance.

Other objects and advantages of this invention will become apparent in the following specification and in the accompanying drawings; wherein FIG. 1 is a fragmentary perspective view of a tire tread constructed in accordance with this invention.

Figure 1:
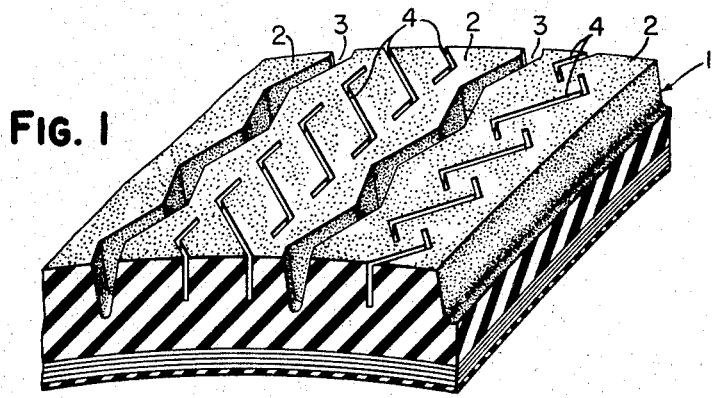
Figure 3:
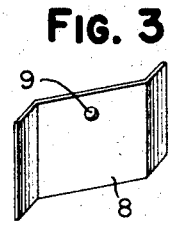
FIG. 3 is a perspective view of one of the blades used in the casting, FIG. 2.
Figure 2:
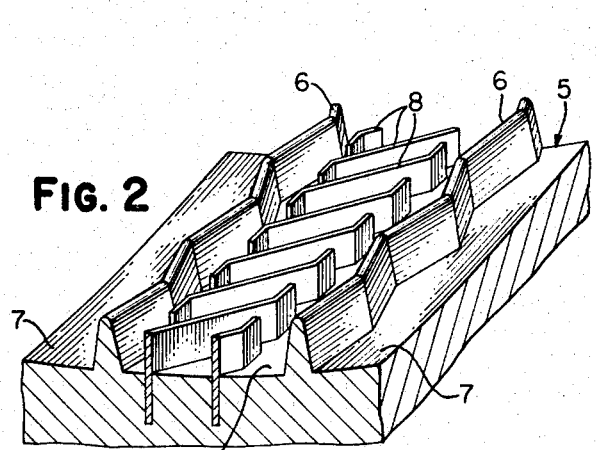
FIG. 2 is a fragmentary perspective view of a tread-forming casting.

Referring now to the drawings, FIG. 1 shows a segment of a tire tread 1 having a plurality of tread ribs 2 defining grooves 3 therebetween, each of the ribs 2 having a plurality of thin slots 4 molded in the surface thereof. Neither the particular pattern of the slots 4, nor the rib and groove configuration form a part of this invention but are merely illustrative of a typical tread pattern in which the problem solved by this invention may be encountered. A tread-forming casting 5, shown in FIG. 2, has a plurality of ribs 6 which form the grooves 3 in the molded tire tread 1. Between each pair of ribs 6 is a groove 7 which in turn forms one of the ribs 2 in the molded tire tread 1. A plurality of blades 8 are embedded in the bottom of some or all of the grooves 7 in a configuration which will form a desired pattern of slots 4 in the tire tread 1. Each of the blades 8, as shown individually in FIG. 3, is constructed of a very thin sheet of metal which in the example shown is bent in a Z shape but if desired may be flat, or may be bent into any desired configuration, depending upon the shape of slot which is required for a particular tread design.

Figure 5:
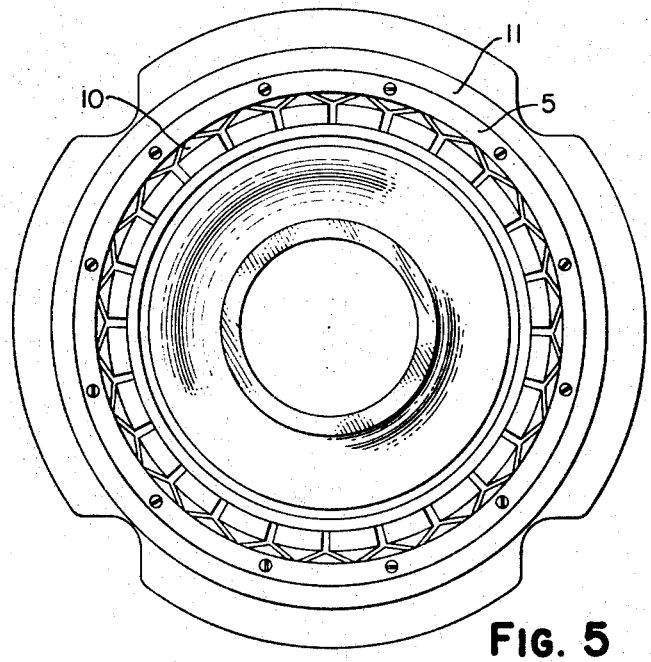
FIG. 5 is a plan view showing one-half of a finished mold with the tread-forming casting in place.

The process for making a tire mold of a type shown in this application starts with the molding of the casting 5 around a core of a tire (not shown) made of plaster or other suitable material with the desired number of blades 8 projecting therefrom. Upon removal of the tire core from the casting 5 the blades 8 remain embedded in the casting. For easy separation of the core from the blades, a suitable parting agent may be coated on the portion of the blades embedded in the core. If the core is made of breakable material such as plaster, it may be broken away from the casting leaving the blades 8 in the casting. The core may also be made in sections for easy assembly. The casting 5 may be made in one piece in a complete annular ring to form one-half of a tire mold, as shown by the numeral 10 in FIG. 5. The tread-forming casting is normally mounted in an annular back-up shell 11 which provides sufficient rigidity to support the casting 5 and prevent it from distortion when under heat and pressure during the molding of a tire. The casting 5 may also be made in a plurality of segments instead of a single annular ring. In such case, the segments are fastened to the annular back-up shell in much the same manner as when the casting 5 is made in one piece.

Figure 4:
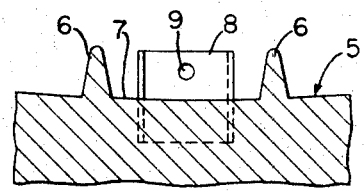
FIG. 4 is a cross-sectional view of a tread-forming casting shown in FIG. 2 showing a blade embedded therein, before machining the tread-forming surface.
Figure 6:
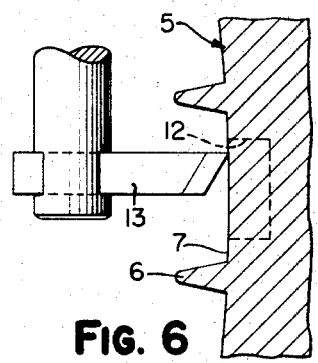
FIG. 6 is a fragmentary cross-sectional view similar to FIG. 4 but with the blades removed during machining of the surface of the casting.
Figure 7:
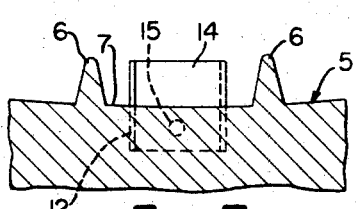
FIG. 7 is a fragmentary cross-sectional view of the tread-forming casting shown in FIG. 6 after machining of the surface has been completed and a blade placed in the slot from which it or a similar blade was removed prior to machining.

After the casting 5 has been solidly and permanently mounted in the back-up shell 11, it is positioned on a cutting machine such as a vertical boring mill (not shown) with all the blades 8 removed from the casting. In preparation for machining, the tread-forming portion of the casting 5, the blades 8 are extracted from the casting at any convenient time, either before or after mounting the casting in the back-up shell 11. This can be accomplished either by gripping the blades 8 with pliers, or the like, and withdrawing them from the casting 5, or by inserting a hook through a hole 9 in each blade 8 shown in FIG. 4 and pulling upon the blade to remove it from the casting 5, leaving a slot 12 therein where each blade has been removed. With all the blades 8 removed, this leaves all the bottom surface of the grooves 7 unobstructed for machining without damage to the blades. A cutting tool 13 of the boring machine, or other cutting device, is brought into contact with the bottom of groove 7, as shown in FIG. 6, to machine off surface irregularities of the casting 5. In a casting such as the one shown in FIG. 2 in which the ribs 6 are of a zig-zag, or irregular, contour the entire surface at the bottom of groove 7 may not be reached by the cutting tool 13. In such case, it may be necessary to machine the surface adjacent the rib 6 with a hand router, or other similar cutting tool. After completion of the machine operation, the blades 8 if undamaged during removal from the mold 5, may be reinserted in slots 12 or blades 14 similar to the blades 8 may be inserted in the slot 12 (FIG. 7) from which the blades 8 were removed. If any of the blades 8 are bent or damaged during removal, they, of course, should be replaced by undamaged blades when being reinserted in the mold casting 5 after machining of the grooves 7. The blades 14 may have a dimple 15 in the portion extending into the slot 12 to more firmly wedge the blade 14 in the slot 12. Each of the blades 14 may also be secured in the slots 12 by use of any suitable adhesive, or bonding agent which will not deteriorate when subjected to heated mold temperatures.

Thus it may be seen that the bottom of the tread forming groove 7 has been machined to remove any irregularities of contour and to produce a tire mold with proper concentricity without damage to the blades and without the inconvenience of having to work around the blades while machining the surface of the groove 7. It will be understood that this method can be used regardless of the number of tread forming grooves to be machined in each mold.

Various changes can be made in the illustrative embodiments shown herein without departing from the scope of the invention.

What is claimed is:
1. A method of making a tire mold comprising the steps of:
 (A) forming a core in the shape of a tire tread having thin metal blades embedded therein with a portion of each blade extending above the surface of the core,
 (B) pouring against the core a rigid complemental casting with the extended portion of the blades embedded therein,
 (C) removing the core from the mold thereby leaving the extended blades embedded in said casting,
 (D) removing the blades from the casting leaving slots therein,
 (E) machining the surface of the casting in which the slots are located,
 (F) inserting blades in the slots with a portion of each blade extending above the casting surface.

2. The method according to claim 1 wherein the blades are removed from the casting by exerting a pull on a special connection means on the portion of each blade projecting from the casting.

3. The method according to claim 1 wherein the machining step comprises rotating the casting about its axis while bringing a cutting tool into engagement with the inner surface of the casting to remove a portion thereof, stopping rotation of the casting and removing an additional portion of the casting surface.

References Cited

UNITED STATES PATENTS

| | | | |
|---|---|---|---|
| 2,660,767 | 12/1953 | Heintz | 164—10 |
| 2,896,281 | 7/1959 | Miller et al. | 164—10 |
| 2,983,004 | 5/1961 | Spier et al. | 164—10 |
| 969,131 | 8/1910 | Cobb | 264—225 |
| 1,380,320 | 5/1921 | Hufford | 264—225 |
| 1,599,534 | 9/1926 | Kerley | 264—227 |
| 2,263,001 | 11/1941 | Gunsaulus et al. | 164—10 |
| 2,560,052 | 7/1951 | Miller | 264—227 |

JULIUS FROME, *Primary Examiner.*

J. R. THURLOW, *Assistant Examiner.*

U.S. Cl. X.R.

264—219; 164—10; 29—159.1